Sept. 13, 1960  J. H. REESE ET AL  2,952,117
BALANCE WHEEL FOR ELECTRIC WRIST WATCHES
Filed Feb. 10, 1956
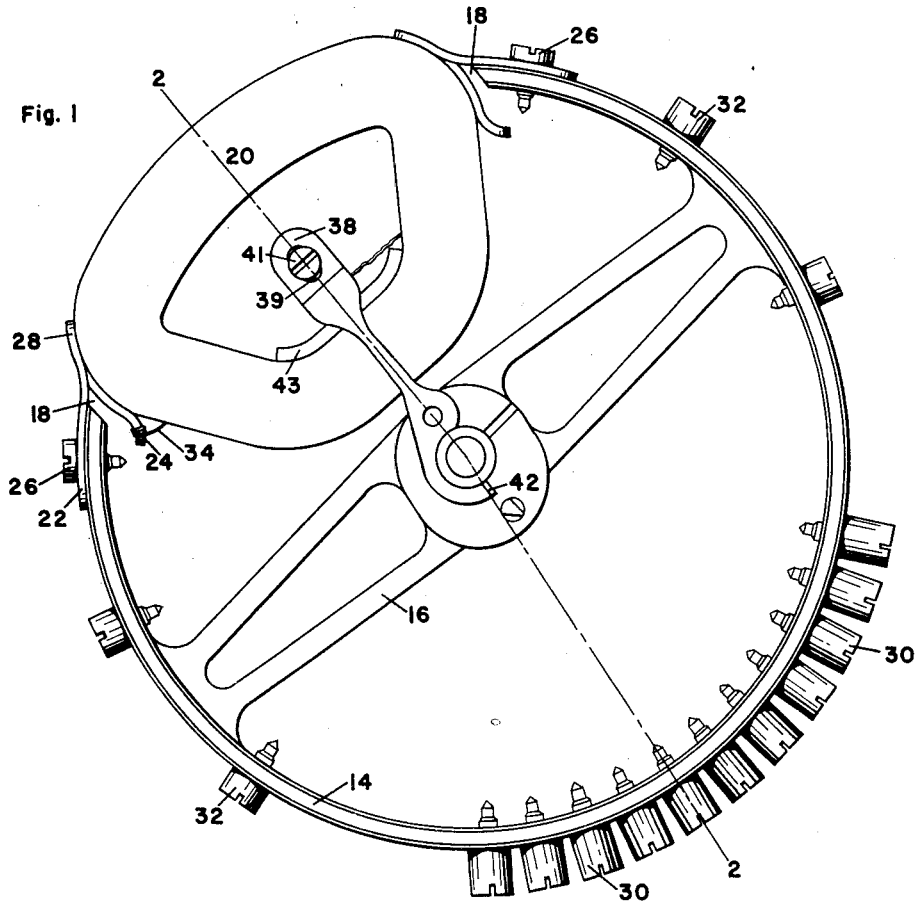
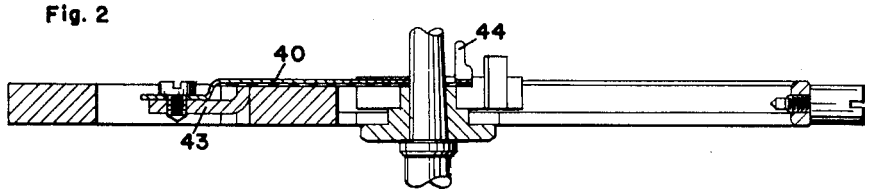
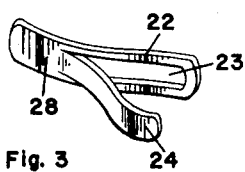
*INVENTOR*
James H. Reese
Harry S. Detwiler
BY
*ATTORNEY*

United States Patent Office 2,952,117
Patented Sept. 13, 1960

2,952,117

BALANCE WHEEL FOR ELECTRIC WRIST WATCHES

James H. Reese, Manheim, and Harry S. Detwiler, Lancaster, Pa., assignors to Hamilton Watch Company, Lancaster, Pa., a corporation of Pennsylvania Filed Feb. 10, 1956, Ser. No. 564,722

10 Claims. (Cl. 58—28)

This invention relates to a balance wheel for electric watches, and more particularly that type of balance wheel carrying an oscillating coil adapted to be moved in a permanent magnetic field.

In the making of a permanent magnet battery operated electric watch having an oscillating coil passing through the magnetic field, it was necessary to mount the coil on the balance wheel so that the greatest area of coil could be passed through the magnetic field which is consistent with the allowable space within the watch-case. It was, therefore, necessary to design a balance wheel to support a coil and to counterbalance that coil. The coil carries a contact, the position with regard to the balance staff is extremely critical. It is, therefore, necessary to provide means for adjusting the coil radially of the balance wheel. While this adjustment is in the nature of several ten thousandths of an inch, it is extremely critical and provision must be made in the mounting of the coil for adjusting its carried contact with regard to the center of the balance wheel.

The object of the invention is to provide a balance wheel for an electric watch carrying a coil and supporting a contact for contact making and breaking position.

It is a still further object of the present invention to provide a balance wheel for electric watches which is essentially the same as a balance wheel for mechanical watches in that the balance staff may be changed using the same tools as for a mechanical watch, and yet at the same time provide means for supporting a coil and contact making elements.

It is a further object of the present invention to provide means consisting of an adhesive plastic for attaching the coil to the balance wheel, and to include in the structure of the coil attaching means the need for an absolute minimum of plastic cementing material. Experimentation has shown that the use of an adhesive is the only practical method of attaching the coil to the balance wheel, but it has further shown that plastic absorbs moisture and if any sufficient quantity of plastic is used to cement the coil to the balance wheel the timekeeping ability is seriously affected.

It is a further object of the present invention to provide structure for securing a coil to a balance wheel which will utilize the least amount of nonfunctional mass for the mounting purpose.

It is a still further object of the present invention to provide for the use of a minimum amount of metal for attaching the coil to the balance wheel in that this metal must pass through the permanent magnetic field. By maintaining this metal at a minimum the eddy current losses are held at a minimum.

It is a still further object of the present invention to provide a means for mounting a coil on a balance wheel which may be demountable so that should a difficulty arise in the coil it can be quickly and easily exchanged.

It is a further object of the present invention to provide means for mounting a coil on a balance wheel so that the coil is radially adjustable with regard to the balance wheel and to provide means for supporting a contact arm on the coil, said contact arm also being radially adjustable relative to the balance wheel.

The invention is shown in the accompanying drawing in which:

Figure 1 is a top plan view of the balance wheel.

Figure 2 is a cross section on line 2—2 of Figure 1.

Figure 3 is a perspective view of the coil supporting fixture.

A balance wheel formed with a solid rim 14 and a cross bar 16 is broken at 18 to provide space for the insertion of a coil 20. A Y-shaped coil supporting fixture 28 is provided with a rim engaging leg 22 and a coil engaging tongue 24 and is attached to the balance rim by screws 26. The fixture 28 has the tongue 24 punched out and bent at the required angle to engage the side of the coil, with the extreme end adapted to receive the wire 34 for connection. The leg 22 of the fixture 28 has a slot 23 formed by reason of the punched out tongue 24 and is adapted to be secured to the rim by the screw 26 passing through this slot 23. By means of the slot the coil is radially adjustable with respect to the balance wheel to provide means for locating the coil so that at the moment of electrical contact the greatest area of the coil will be at the position in the magnetic field where it will receive its greatest impetus.

Screws 30 secured to the rim 14 of the balance wheel at a point opposite to the coil serve to counterbalance the weight of the coil and are adjustable to provide for any variation in the distance the coil is placed from the center of the balance wheel. Screws 32 located on each side of the rim adjacent the cross bar serve as weights for poising the wheel. One end of the coil 34 is grounded to the rim at 36, while the other end of the wire of the coil is secured to a contact arm 38 which extends inwardly toward the center of the balance wheel and is insulated from the balance wheel by insulated strip 40, said contact arm terminating in an upright contact 42. Contact 42 has a fingerlike projection 44 adapted to engage a stationary contact during the oscillation of the balance wheel.

The contact arm 38 is provided with an elongated slot 39 through which a screw 41 holds said contact arm to a fixture 43. The fixture 43 is secured by an adhesive cement to the coil and provides means for fastening the arm 38 so that it can be radially adjusted with respect to the center staff of the balance wheel. The adjustment of the end 42 of the contact strip is extremely critical as it influences the duration of contact and to some extent the point at which contact is made. In the matter of keeping time the duration of contact is extremely important, as a current flowing too long in the coil would produce undesirable magnetism in the coil at a time when it had passed through the operative point of the permanent magnetic field.

The use of an electric coil as part of a balance wheel is not new in the art, but the means of attaching that coil, using the minimum amount of plastic adhesive and providing adjustability and interchangeability, with the addition of the smallest amount of mass being added to the balance wheel, makes it possible to make a battery electric wrist watch which can be adjusted to keep accurate time.

What is claimed is:

1. A balance wheel for an electric watch comprising a cross bar, a rim, said rim having a portion of its arc broken away, a coil, one of the sides of said coil being in the form of an arc having a radius substantially equal to the radius of the balance wheel rim, and means for mounting said coil between the ends of said rim so that the arc of said coil substantially fills the space between the ends of said rim and is substantially concentric with the center of said balance wheel.

2. A balance wheel for an electric watch comprising a cross bar, a rim, said rim having a portion of its arc broken away, a coil carried between the ends of said rim, means mounting said coil to said rim for adjustment toward and away from the center of said balance wheel, and counterbalancing means attached to said rim at a point diametrically opposite said coil.

3. A balance wheel for an electric watch comprising a cross bar, a rim, said rim having a portion of its arc broken away, a coil, a pair of fixtures attached to opposite sides of said coil, said fixtures having elongated slots therein, and a screw passing through said slot and into the rim of said balance wheel adjacent the ends thereof to adjustably secure said coil to said rim.

4. A balance wheel for an electric watch comprising a cross bar, a rim, said rim having a portion of its arc broken away, a coil, a pair of fixtures attached to opposite sides of said coil, means for adjustably securing said fixtures to the rim of said balance wheel, a roller plate carried centrally of said cross bar, a bracket secured to said coil, a contact member adjustably secured to said bracket and extending radially of said balance wheel and terminating adjacent said balance staff and above said roller.

5. A balance wheel for an electric watch comprising a cross bar, a rim, said rim having a portion of its arc broken away, a coil, a pair of identical fixtures secured to opposite sides of said coil, screws carried by the rim and adjustably securing said fixtures to said rim, a bracket carried by said coil, a roller carried centrally of said balance wheel, a contact member electrically connected to said coil and extending radially to terminate above said roller, and means for adjustably securing said contact member to said bracket to provide relative adjustment between said contact member and said roller.

6. A balance wheel for an electric watch comprising a cross bar, a rim, said rim having a portion of its arc broken away, a coil, a pair of identical fixtures secured to opposite sides of said coil, one of said fixtures being electrically connected to said coil to provide a ground, screws carried by the rim and adjustably securing said fixtures to said rim, a bracket carried by said coil, a roller carried centrally of said balance wheel, a contact member electrically connected to said coil and extending radially to terminate above said roller, means for insulating said contact member, and means for adjustably securing said contact member to said bracket to provide relative adjustment between said contact member and said roller.

7. A balance wheel as set out in claim 3 wherein each fixture comprises a generally Y shaped member wherein one leg of said Y comprises a tongue punched from the other leg, the slot resulting from the formation of said tongue forming said slot through which said screw passes.

8. A balance wheel as set out in claim 7 wherein said tongues are attached to said coil and said other legs are attached to said rim by said screws, the ends of said rim at said broken away portion extending between said legs of said fixtures.

9. A balance wheel for an electric watch comprising a hub, a rim concentric with said hub, a crossbar supporting said rim from said hub, said rim having a portion of its arc broken away, a coil between said hub and rim and having a portion thereof between said ends of said rim, and means for securing said coil to said ends of said rim.

10. A balance wheel for an electric watch comprising a hub, a rim concentric with said hub, a crossbar supporting said rim from said hub, said rim having a portion of its arc broken away, a coil between said hub and rim and having an arcuate portion thereof between said ends of said rim, said arcuate portion being substantially concentric with said hub, and means for mounting said coil between the ends of said rim.

References Cited in the file of this patent

UNITED STATES PATENTS

| | | |
|---|---|---|
| 853,648 | Powers | May 14, 1907 |
| 2,385,252 | Bennett | Sept. 18, 1945 |
| 2,495,858 | Marti | Jan. 31, 1950 |
| 2,806,908 | Van Horn et al. | Sept. 17, 1957 |

FOREIGN PATENTS

| | | |
|---|---|---|
| 21,616 | France | Aug. 24, 1920 |

(First addition of 494,398)